Figures 1, 2:
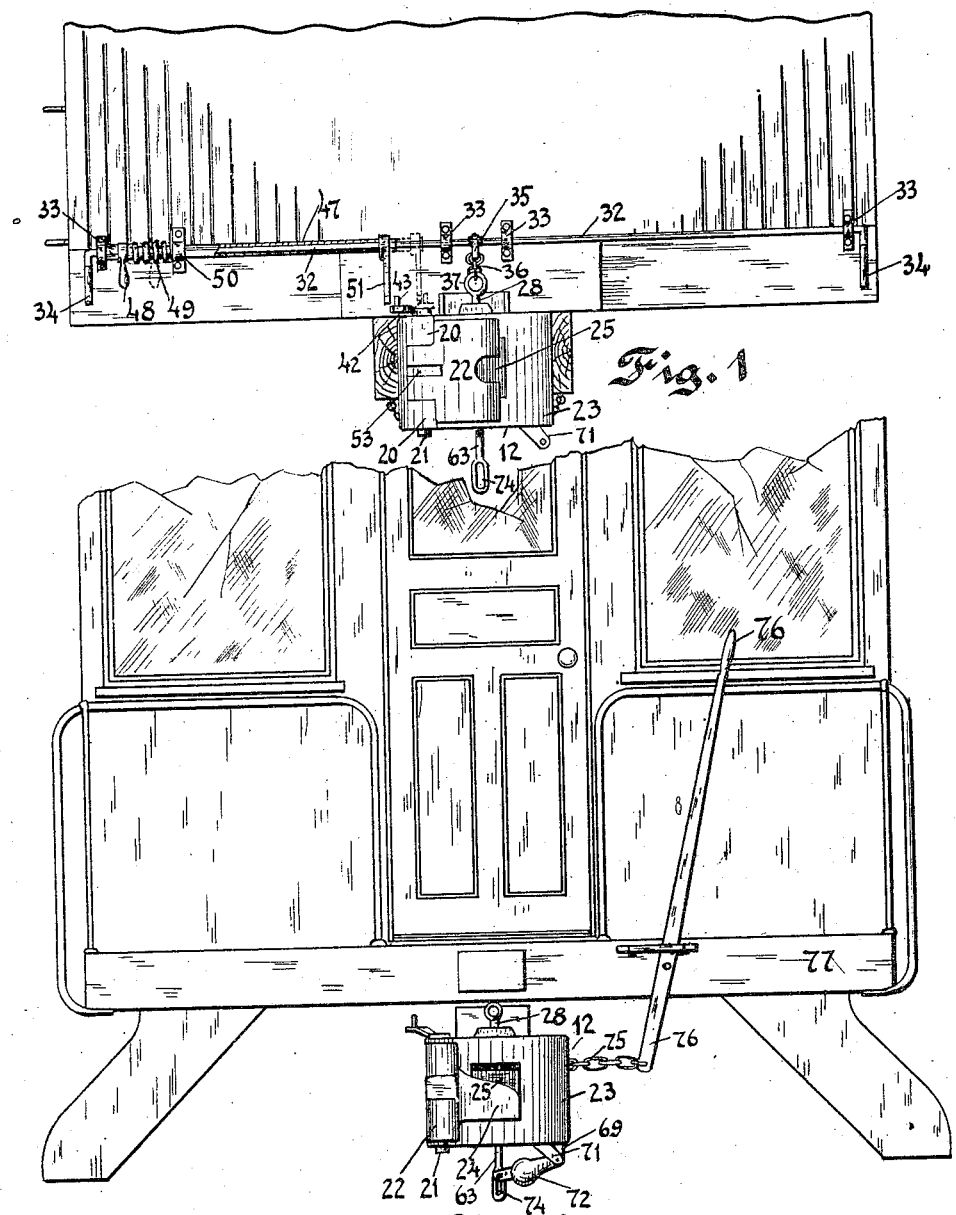

No. 861,413.

PATENTED JULY 30, 1907.

F. H. WENDT.
CAR COUPLING.
APPLICATION FILED MAY 24, 1906.

5 SHEETS—SHEET 1.

Fred H. Wendt, Inventor

Witnesses
Florence E. Hill
Gertrude H. Boink

By George Wetmore Colles
Attorney

No. 861,413.

PATENTED JULY 30, 1907.

F. H. WENDT.
CAR COUPLING.
APPLICATION FILED MAY 24, 1906.

5 SHEETS—SHEET 2.

Fred H. Wendt, Inventor

Witnesses
Florence E. Hill
Gertrude H. Boink

By George Wetmore Colles
Attorney

THE NORRIS PETERS CO., WASHINGTON, D. C.

No. 861,413. PATENTED JULY 30, 1907.
F. H. WENDT.
CAR COUPLING.
APPLICATION FILED MAY 24, 1906.
5 SHEETS—SHEET 4.

Witnesses
Florence E. Hill
Gertrude H. Brink

Fred H. Wendt, Inventor,
By George Wetmore Colles
Attorney

No. 861,413.

PATENTED JULY 30, 1907.

F. H. WENDT.
CAR COUPLING.
APPLICATION FILED MAY 24, 1906.

5 SHEETS—SHEET 5.

Fred H. Wendt, Inventor

Witnesses
C. E. Brake
Gertrude H. Boink

By George Wetmore Colles
Attorney

THE NORRIS PETERS CO., WASHINGTON, D. C.

UNITED STATES PATENT OFFICE.

FRED H. WENDT, OF MARSHFIELD, WISCONSIN.

CAR-COUPLING.

No. 861,413.          Specification of Letters Patent.          Patented July 30, 1907.

Application filed May 24, 1906. Serial No. 318,472.

*To all whom it may concern:*

Be it known that I, FRED H. WENDT, of Marshfield, Wisconsin, have invented a Car-Coupler, of which the following is a specification.

This invention relates to car-couplers of the automatic type having a pivoted knuckle which acts as the engaging element.

The objects of the present invention are, among others, to provide a coupler with improved locking and unlocking means; means for opening the knuckle from the side of the car; and to provide means for holding the coupler unlocked while in the closed position.

An important feature of my invention consists in the means for opening the knuckle from the side of the draw-head itself without the necessity of taking hold of the knuckle directly, which necessity exists in car couplers as at present constructed and is the cause of numerous accidents and fatalities annually.

Another important feature consists in means for supplementing the knuckle-pin in holding the knuckle and preventing the uncoupling of the car in case the knuckle-pin breaks.

Another important feature of my invention consists in the means whereby the locking mechanism is held out of engagement with the knuckle while the latter is still closed, as is very desirable in case two cars are to be uncoupled while standing still upon the track and without waiting till one of them is moved away. This feature embodies means whereby the locking mechanism is automatically closed again as soon as a coupling operation takes place.

Another feature of my invention consists in means adaptable to use on passenger-cars for operating the locking-mechanism to unlock the knuckle, this means embodying also a device for holding the mechanism unlocked while the knuckle still remains closed, and the knuckle itself being caused to close the locking-mechanism in the act of opening.

Other features of my invention will be hereinafter described and particularly pointed out in the claims.

Figure 3:
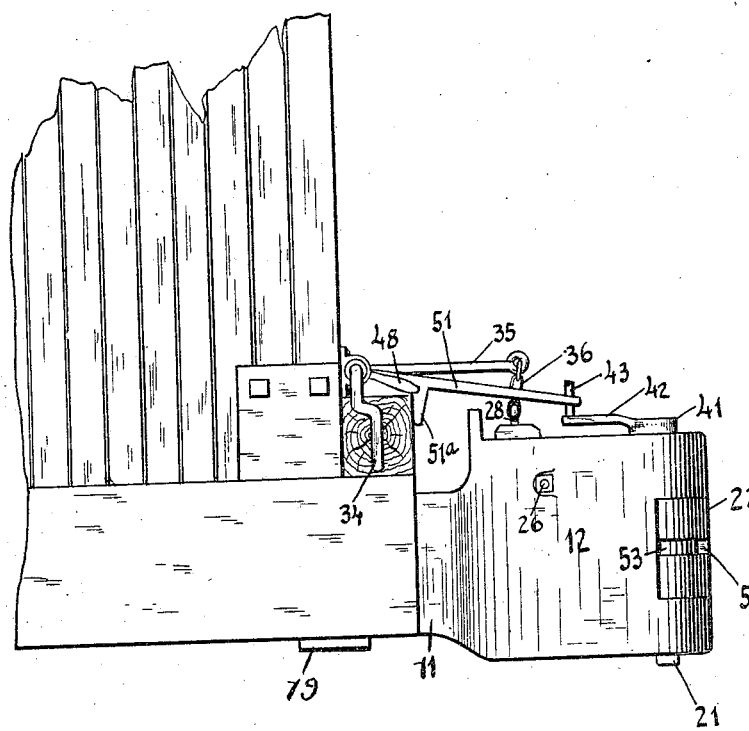
Figure 4:
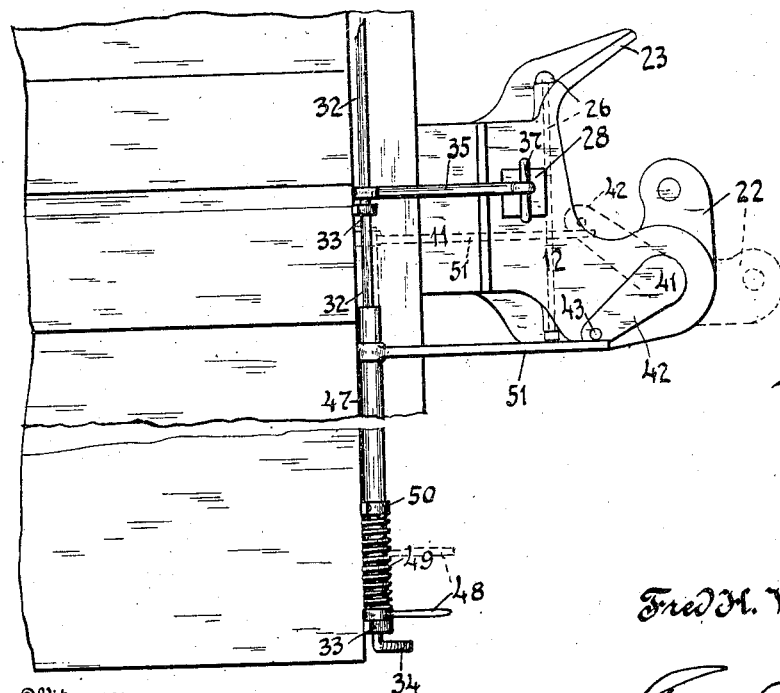
Figure 5:
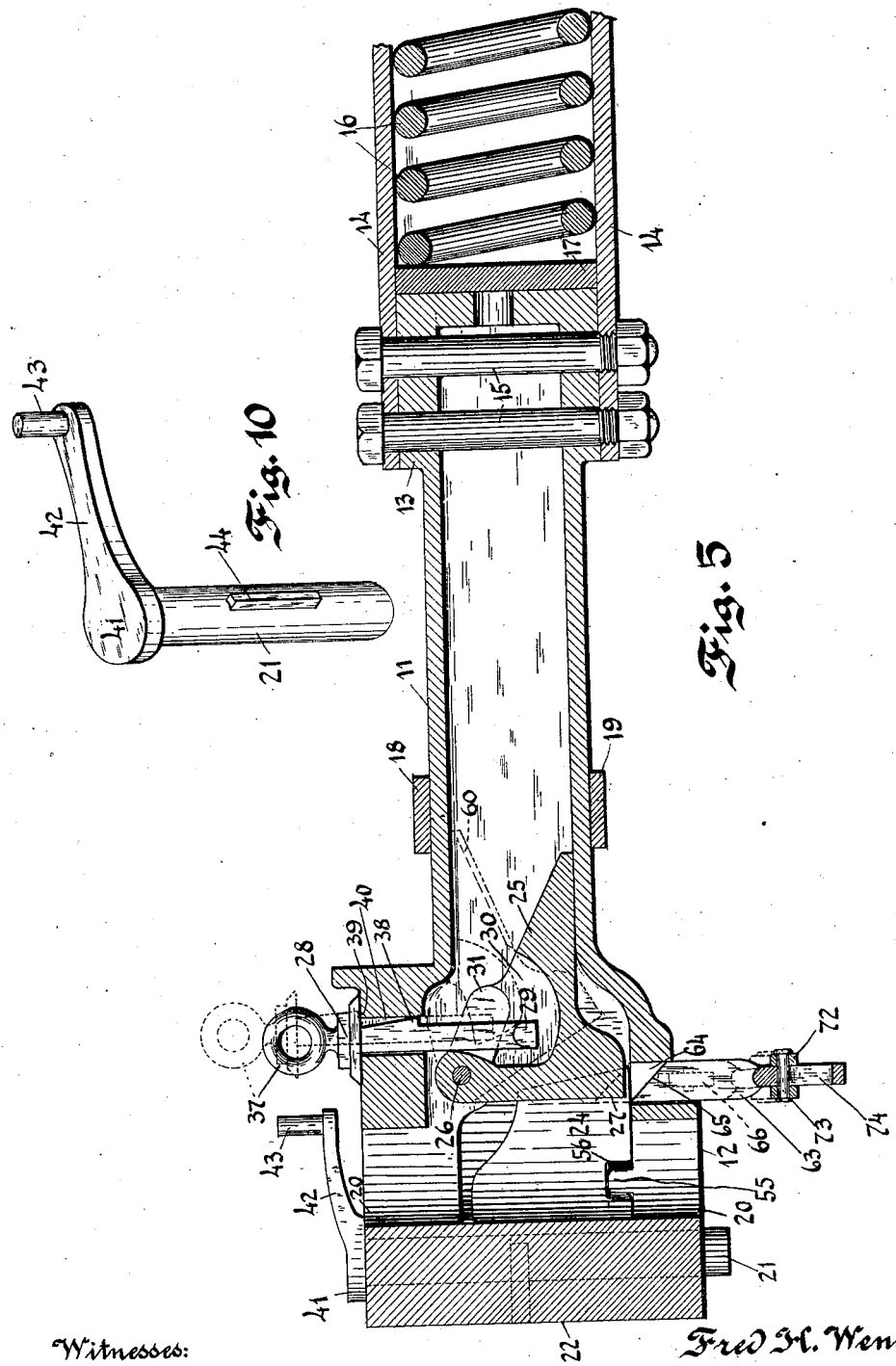
Figure 6:
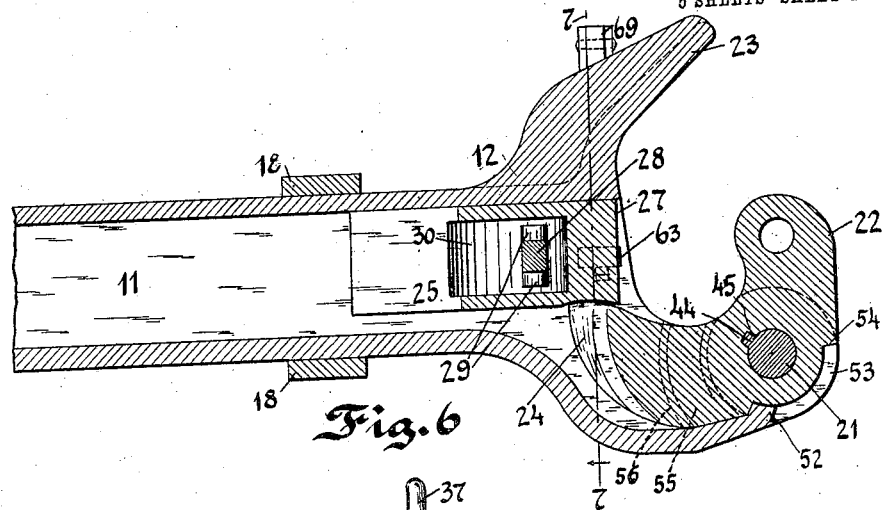
Figure 7:
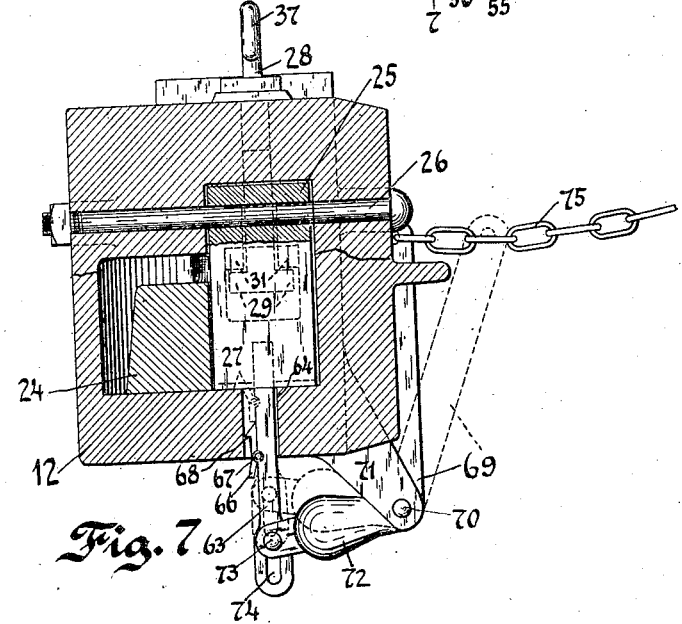
Figures 8, 9:
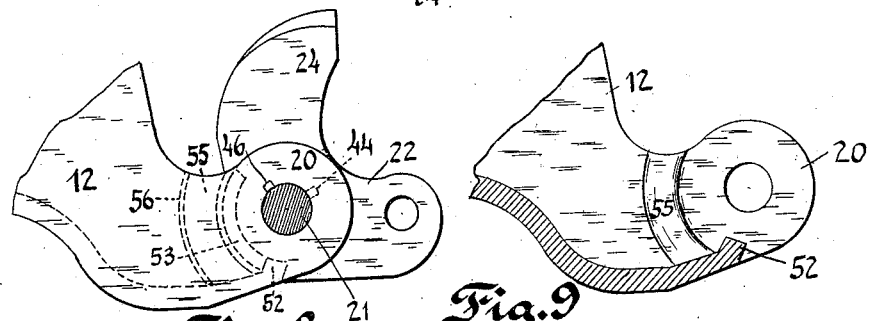
Figure 12:
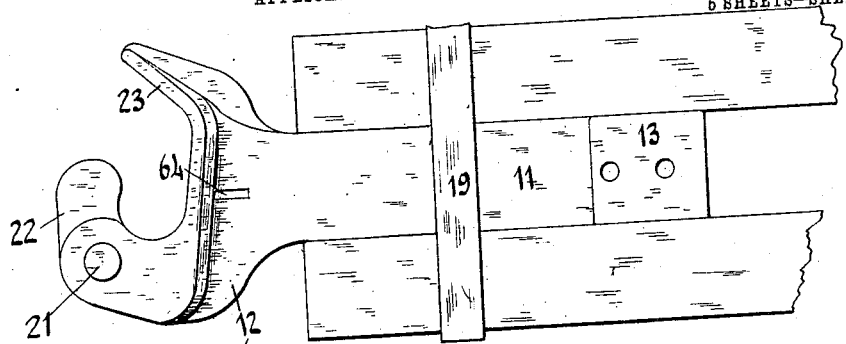
Figure 13:
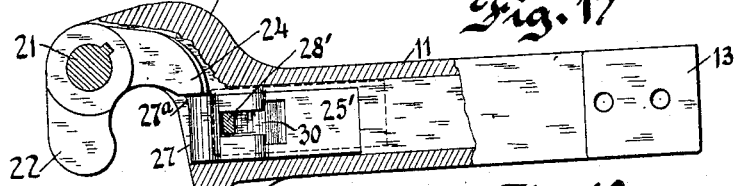
Figure 14:
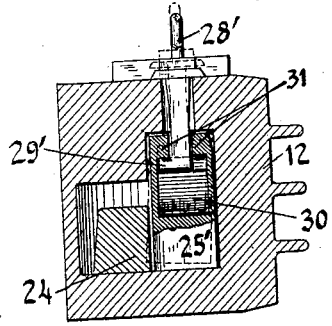
Figure 15:
Figures 11, 16:
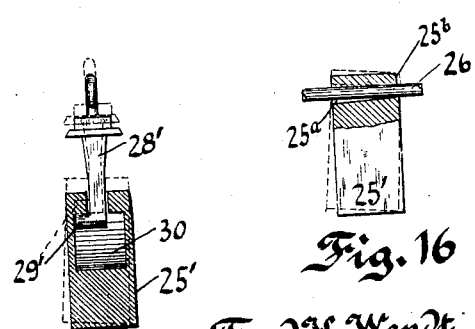

My improved form of coupler is illustrated in the accompanying drawings, in which Figure 1 is a fragmentary elevation of the end of a box-car-body showing a front view of my coupler mounted thereon (the knuckle being closed); Fig. 2 is an end view of a passenger car-body showing my coupler mounted thereon (the knuckle being open); Fig. 3 is a side view of the coupler and mounting as shown in Fig. 1, on a larger scale; Fig. 4 is a fragmentary plan view of the same; Fig. 5 is a longitudinal central section through the coupler; Fig. 6 is a longitudinal plan section through the front end thereof; Fig. 7 is a transverse section on the plane indicated by the line 7, Fig. 6; Fig. 8 is a fragmentary plan view of the knuckle-side of the drawhead with the head of the knuckle-pin cut away; Fig. 9 is a fragmentary plan section-through the knuckle-side of the draw-head with the knuckle removed; Fig. 10 is a perspective view of the knuckle-pin; Fig. 11 is a transverse section through the locking-block in the axis of the uncoupling pin showing the latter in elevation. Fig. 12 is a bottom plan view of the coupler as mounted in place; Fig. 13 is a plan, partly in longitudinal section, of a form of coupler with an additional means for holding the knuckle unlocked while closed; Fig. 14 is a transverse section through the draw-head to show the operation of this feature; Figs. 15 and 16 are respectively a plan and front elevation, partly broken away, of the locking-block as provided with this feature.

In these drawings every reference character refers always to the same part.

The coupler embodies the usual draw-bar 11 having a draw-head 12 and rear-head 13 to which is secured the U-shaped strap 14 by means of bolts 15. At 16 is shown the draw-spring and at 17 one of the follower-plates which are common to this type of coupler; and at 18 and 19 are shown the guide and carrier-irons in which the shank of the draw-bar slides.

The draw-head 12 has on one side a pair of pivot-lugs 20 in which is mounted a knuckle-pin 21, on which turns the knuckle 22, and on the other side of the draw-head is the jaw 23 which coöperates with the knuckle in the well known manner.

The knuckle in my coupler has a heel 24 which is engaged by a triangular shaped locking-block 25, which is pivoted upon a pin 26 passing transversely across the draw-head. The front end 27 of the locking-block 25 when in the position shown in full lines, Fig. 3, into which position it swings by its own weight, lies across the path of the heel 24 of the knuckle and prevents the latter from opening; the face of the heel being preferably convexed (see Fig. 6), and that of the block slightly concaved on their abutting surfaces, so that the friction between them will not tend to open the block. When the block 25 is tipped into the dotted line position, the front edge 27 clears the heel 24 and allows it to open. This tipping is accomplished, in ordinary freight-cars, by a pin 28 which has at its lower end a pair of laterally extending lugs 29 (see Fig. 6); and the block 25 has a central recess or chamber 30 open along its upper side through which the end of the pin 28 passes, and a pair of lateral overhanging lugs 31 under which the lugs 29 engage, so that the raising of the pin 28 causes the tilting of the block 25 into the dotted-line position as shown. The raising of the pin 28 is ordinarily accomplished by means of a rock-shaft 32 which is mounted on the car-body in bearings 33 and extends from side to side thereof, having on one or both ends a handle 34, and in the center a lever-arm 35 which is secured by a chain 36 to the eye 37 formed on the upper end of the pin 28, so that the rocking of one of the handles 34 causes the pin 28 to be raised. Moreover, the pin 28 (whose shank is rectangular to prevent it from turning) has on its rear face a shoulder 38 which is in position to engage over the edge 39 of the recess 40 in which it moves, and this engagement is caused to take place automatically when the pin is raised by the operation of the handles 34 as aforesaid, because in this position it will be seen that the lower surfaces of the lugs 31 slants upwardly and rearwardly, thus throwing the pin 28 toward the rear; therefore, when the coupler is unlocked, the pin 28 and locking-mechanism are held in the dotted-line position, Fig. 5, until a new coupling operation takes place, and this enables a train-hand to uncouple the cars while standing together on the track and go away and leave them uncoupled. This device for holding the locking-mechanism open does not interfere with the automatic coupling operation, because when the coupler of another car is brought against it to couple the two together, the jar causes the pin 28 to be thrown forward, disengaging the shoulder 38 from the edge 39, and the locking-mechanism drops back again.

In addition to the device just described for holding the knuckle unlocked, or in place thereof, I may provide the means illustrated in Figs. 13 to 16, a construction which has been omitted from the previous figures for clearness' sake to avoid too much complication. In this form the locking-block is designated 25', and the hole 25$^a$ through which the pivot-pin 26 passes is slightly enlarged or widened vertically on the side adjacent to the knuckle, so that the block can have a slight transverse tilting movement, as indicated by the dotted lines in Fig. 16, the opposite upper edge 25$^b$ of the block being rounded off, if necessary, to give a free movement to the block. Also, the front face 27 of the locking-block may have on the edge next to the knuckle, a slight projection or cusp 27$^a$, though this is not necessary to accomplish my object. The uncoupling-pin 28 is in this case provided with only one lug 29 (and only one lug is necessary in any case), the lug on the side opposite the knuckle being removed whereby the lifting of the pin 28 tends to tilt the locking-block toward the knuckle, and this tilting takes place as soon as the lower edge of the locking-block has been withdrawn far enough to release the heel 24 of the knuckle. Consequently, when it has reached this point in uncoupling, the locking-block will engage behind the heel 24 and will remain in this position, even should the pin 28 be dropped, until after the knuckle has opened, which will again release the locking-block, and it will drop into locking-position again. When the knuckle is automatically closed by engaging that of another coupler, the locking-block 25 will swing back to allow the heel 24 to pass it as before, but will not engage behind the heel 24, because the weight of the locking-block will hold it central. The cusp 27$^a$ is intended merely to increase the friction against the end of the heel, and may be found unnecessary in practice.

It often happens when two cars are about to be coupled that the knuckle on one or both couplers has in some way become closed, and it must be opened before the cars can be coupled. With couplers as at present constructed, the only way to do this is by taking hold of the knuckle itself and turning it into the open position, but this is dangerous to the life and limb of the operative. In my coupler, however, I provide means for opening the knuckle without touching the coupler, and this is effected by the peculiar form of knuckle-pin which may be operated in conjunction with auxiliary means mounted upon the car-body. The head 41 of the knuckle-pin 21 has a lateral extension 42 in the form of a crank, and at the end thereof an upright pin 43 which may act as a handle to rotate the pin, or as means of striking it by the auxiliary device upon the car-body, which will be described presently. Furthermore, the shank of the pin 21 is formed with a spline or feather 44 along the middle part of its length, this spline engaging in a groove or key-way 45 formed in the eye of the knuckle 22, through which the pin passes; so that the rotation of the kunckle-pin by the crank 42 causes the rotation of the knuckle. The upper draw-head-lug 20 is also provided with a groove 46 through which the spline 44 passes when the pin is dropped into place, but the spline is not long enough to engage with this groove.

The auxiliary knuckle-opening device (which may be omitted if desired) comprises, as here shown, a hollow sleeve 47 mounted upon the rock-shaft 32 and sliding longitudinally thereon. This sleeve has mounted on one end a handle 48. Against this presses a coiled compression-spring 49 whose other end abuts upon a bearing-block 50, so as to hold the sleeve normally in the position shown in Fig. 1. On the inner end of the sleeve is mounted a bar 51 which has an offset 51$^a$ extending downwardly to form a rest or support to hold the bar projecting outwardly, as shown in Fig. 3, so that its end lies across the side of the pin 43. To open the knuckle it is only necessary to push the handle 48 inwardly, and the rod 51 acts on the pin 43 to rotate the knuckle-pin 21 and the knuckle with it into open position.

In order to limit the opening movement of the knuckle, the draw-head is provided on its inner face between the two lugs 20 with a snug or projection 52, the same lying in a groove 53 formed around the outer side of the knuckle, the end 54 of this groove being so placed that it abuts against the snug 52 at the limit of its movement.

I also provide means for maintaining the operativeness of the coupler and prevent it from uncoupling in case the knuckle-pin 21 should break as occasionally happens; the said means comprising a raised arcuate lug 55 on the upper face of the lower lug 20 of the head and a coöperating arcuate groove 56 on the under side of the knuckle. Should the knuckle-pin break, the knuckle is held in position by the lug 55.

In the case of passenger-cars it is generally inconvenient to unlock the coupler by means of the pin 28, as, owing to the existence of the end platform, there is insufficient room above the coupler to raise the pin. I may, therefore, provide additional means for oscillating the locking-block to release the knuckle, which is operable from the under side of the draw-head. This means consists of a vertically reciprocating bar 63 which slides in a hole 64 in the center of the underside of the draw-head, immediately below the forward edge 27 of the locking-block, this bar having an oblique upper edge 65 which strikes upon the edge 27 of the locking-block when the bar 63 is pushed up, and oscillates it sufficiently to release the knuckle. I also provide on the side of the bar 63 facing the knuckle a dog 66 pivoted upon a pin 67, which is at the right of its center of gravity, so that the upper end of the dog tends to fall to the left, and this upper end is provided with a hook 68 which engages over the upper edge of the recess 64 when the bar 63 is raised, as clearly indicated by the dotted-line position, Fig. 7. When, therefore, the bar 63 is once raised, it remains in raised position until the knuckle actually opens, which is caused by the two cars moving apart. It will be observed from Fig. 6 that the dog 66 lies in the path of the heel 24 of the knuckle as it swings open, and therefore, in opening, the heel 24 strikes the dog, knocking it off the edge of the recess 64, and the bar 63, being deprived of its support, immediately drops, permitting the knuckle to open wide and at the same time dropping the locking-block 25.

The bar 63 may be raised to release the knuckle in various ways, of which I have herein shown one which is well adapted to passenger-cars. This consists of a bell-crank lever 69 pivoted on a pin 70 in ears 71 on the side of the coupler, this lever having a horizontal arm 72 which is weighted and carries a pin 73 engaging in a slot 74 in the lower end of the bar 63. The other arm of the lever 69 extends upward and is connected by a chain 75 to the lower end of the coupling-lever 76 upon the car-platform 77, which is of the ordinary type.

My coupler may be, where convenient, furnished with both the above devices for uncoupling, or either separately, as the case may call for. For example, in passenger-cars I may leave out the pin 28, and the pin 21 having the crank-arm 42 may be replaced by an ordinary pin, while in most freight-cars the bar 63 and lever 69 may be omitted.

I do not wish it understood that my invention is limited to the use of all the above described features and constructions, for some may be omitted and others may be varied or modified in various ways, as will readily occur to those skilled in the art.

Having thus described my invention, what I claim as new and desire to secure by Letters Patent, is:—

1. In a car-coupler, the combination of a draw-head, a knuckle pivoted thereto, a generally triangular locking-block pivoted on a transverse axis at its upper front corner in said draw-head, the lower forward edge of said block engaging with the heel of said knuckle to lock the same, an upright pin passing through a hole in said draw-head and engaging said locking-block to raise it when the pin is raised, and a shoulder on the rear face of said pin which engages with a part of the draw-head when raised, said shoulder being disengaged from said part by a shock from the front as in a coupling operation.

2. In a car-coupler, the combination of a draw-head, a knuckle-pin pivotally mounted in said draw-head, a knuckle nonrotatably mounted on said pin, a crank upon the upper end of said pin, and a crank-pin on the outer end of said crank.

3. In a car-coupler, the combination of a draw-head, a knuckle-pin pivotally mounted in said draw-head, a knuckle nonrotatably mounted on said pin, a crank upon the upper end of said pin, a crank-pin on the outer end of said crank, and means upon the car-body operated from the side thereof for striking said crank-pin to rotate said crank into the open position of the knuckle.

4. In a car-coupler, the combination of a draw-head, a knuckle-pin pivotally mounted in said draw-head, a knuckle nonrotatably mounted on said pin, a crank upon the upper end of said pin, an elongated piece mounted transversely on the car-body and slidable axially thereon, an arm on said piece lying at one side of said crank, and means for pushing said rod longitudinally whereby said crank is rotated into the open position of the knuckle.

5. In a car-coupler, the combination of a draw-head, a knuckle-pin pivotally mounted in said draw-head, a knuckle nonrotatably mounted on said pin, a crank upon the upper end of said pin, an elongated piece mounted transversely on the car-body and slidable axially thereon, an arm on said piece lying at one side of said crank, a handle on the outer end of said piece, and means for resiliently maintaining said piece in its outward position.

6. In a car-coupler, the combination of a draw-head, a knuckle pivoted thereto and having an arcuate groove on its outer face, and an inwardly projecting lug on the side of said draw-head engaging in said groove, the end of said groove being in position to limit the opening of said knuckle.

7. In combination, a car-body, a transverse rock-shaft, a sleeve slidably mounted on said rock-shaft, handles on the outer ends of said shaft and sleeve respectively, a draw-head mounted on said car-body, an unlocking-pin carried thereby, a lever-arm mounted on said rock-shaft above said pin and connected therewith, a knuckle pivotally mounted on said draw-head, a crank adapted to open said knuckle, and an arm 51 mounted on the inner end of said sleeve and adapted to operate said crank to open the knuckle when said sleeve is moved longitudinally.

8. In a car-coupler, in combination with a draw-head, a knuckle pivoted thereto and having a heel, a locking-piece normally engaging the face of said heel, means for withdrawing said locking-piece, and means for causing said locking-piece when withdrawn to engage the end of said heel whereby it is held against reëngaging the heel until the knuckle has been actually opened.

9. In a car-coupler, in combination with a draw-head, a knuckle pivoted thereto and having a heel, a locking-piece pivotally mounted in said draw-head and normally engaging the face of said heel to hold the knuckle in closed position, said locking-piece being held in said position by its weight, and means for swinging said locking-piece on its pivot out of engagement of the face of said heel, said means being adapted to tilt said locking-piece slightly, whereby it engages the inner end of said heel and is prevented from reëngaging the face of the same until said knuckle has been actually opened.

10. In a car-coupler, in combination with a draw-head, a knuckle pivoted thereto and having a heel, a locking-block pivoted on a transverse axis and having its lower portion normally engaging the face of said heel to hold the knuckle in locked position, said locking-block being capable of a slight transverse tilting movement and having an overhanging lug at the rear of its pivot and on one side of the block, and a pin mounted to rise and fall vertically in said draw-head and having a lug on its lower end engaging under said overhanging lug whereby the raising movement tends to tilt said locking-block transversely; whereby the raising of said pin causes the swinging of said block to disengage said heel, and subsequently, the tilting of said block to be engaged by the end of said heel so as to prevent it from reëngaging the face of said heel until after said knuckle has been actually opened.

In witness whereof I have hereunto set my hand this twenty-second day of May, 1906.

FRED H. WENDT.

In presence of—
GEORGE W. COLLES,
GERTRUDE H. BOINK.